US005572921A

United States Patent [19]

Krumbeck

[11] Patent Number: 5,572,921

[45] Date of Patent: Nov. 12, 1996

[54] LIFT FOR THE HANDICAPPED

[75] Inventor: Keith Krumbeck, 3405 Jack Dr., Missoula, Mont. 59802

[73] Assignees: Keith Krumbeck; Cindy Krumbeck, both of Missoula, Mont.

[21] Appl. No.: 394,665

[22] Filed: Feb. 22, 1995

[51] Int. Cl.$^6$ .......... F16J 15/18

[52] U.S. Cl. .......... 92/165 R; 92/165 PR; 92/117 R; 92/170.1; 92/171.1; 29/888.06

[58] Field of Search .......... 92/2, 165 R, 165 PR, 92/170.1, 117 R, 177, 171.1; 29/888.06, 888.061

[56] References Cited

U.S. PATENT DOCUMENTS

| | | | |
|---|---|---|---|
| 2,888,879 | 6/1959 | Gaarder | 92/170.1 |
| 3,994,539 | 11/1976 | Gottlieb | 92/165 PR |
| 4,141,089 | 2/1979 | Krumbeck | 4/172 |
| 4,221,008 | 9/1980 | Nolan | 4/496 |
| 4,750,408 | 6/1988 | Stoll | 92/165 PR |
| 4,996,728 | 3/1991 | Nolan | 4/496 |
| 5,218,727 | 6/1993 | Krumbeck | 4/563 |

FOREIGN PATENT DOCUMENTS

| | | | |
|---|---|---|---|
| 2007570 | 11/1978 | Germany . | |
| 3511267 | 3/1986 | Germany . | |
| 0147176 | 12/1978 | Japan | 92/165 PR |
| 0010804 | 2/1981 | Japan | 92/177 |
| 0264218 | 1/1927 | United Kingdom | 92/165 R |
| 0884531 | 12/1961 | United Kingdom | 92/170.1 |
| 2197636 | 7/1988 | United Kingdom . | |

OTHER PUBLICATIONS

Spectrum Pool Products *Swim Lift* Brochure, 1992.

*Primary Examiner*—Thomas E. Denion
*Attorney, Agent, or Firm*—Volpe and Koenig, P.C.

[57] ABSTRACT

Disclosed is an improved hydraulic lift system comprising a cylinder housing preferably in the shape of a regular polygon which applies compressive force to a cylinder within the cylinder housing. This cylinder is preferably made from extruded plastic. Within the cylinder is a three ringed piston to which is attached a piston rod. The piston rod is adapted for connection to a horizontal cantilevered arm assembly.

The improved lift permits cantilevered transport from specially designed handicapped chairs and stretchers for access to and egress from a pool or spa.

19 Claims, 8 Drawing Sheets

LIFT FOR THE HANDICAPPED

BACKGROUND OF THE INVENTION

1. Field of the Invention

This invention relates to lift apparatus to assist access to and egress from a pool or spa. More particularly this invention relates to hydraulic lift systems involved in transferring handicapped or physically impaired individuals.

2. Description of the Prior Art

Many aquatic activities are extremely desirable forms of physical therapy for handicapped persons. However handicapped or infirm individuals confined to wheel chairs have had a great difficulty getting into and out of spas and swimming pools. For example, U.S. Pat. No. 5,218,727 expressly incorporated herein by reference of K. Krumbeck issued Jun. 15, 1993 discloses a prior art lift.

The variety of lifts that have been devised to assist the handicapped and infirm involve construction techniques which do not provide materials performance benefits that enable high performance products at very competitive and affordable prices. Accordingly, there is a need for high performance lifts that can be made from material otherwise heretofore believed to have insufficient performance characteristics.

Although prior devices have disclosed the possibility of detaching a wheel chair seat and then attaching it to a lift many of these devices do not provide for an easy transfer of the wheel chair seat for example from its wheeled support frame to a pool lift such as involved in the instant invention. There is a need to have an easy way to transfer either stretchers or wheelchair seats from their support platforms to a pool or spa lift, such as contemplated in this invention. Having wheel chairs specifically designed for easy transfer from their support frames to the lift is considered a collateral aspect of the present invention.

GENERAL STATEMENT OF THE INVENTION

This invention provides a lift apparatus for an above ground spa or pool which enables a handicapped or infirm person to be easily transferred from a wheel chair or stretcher to the lift. The wheel chair and stretcher are specially designed and adapted for use in conjunction with the lift.

The lift includes a hydraulic cylinder assembly which can be powered by water or other fluid. A uniquely designed array of piston grooves permit powered movement up and gravity assisted descent. Such operation, is facilitated by selectively dimensioning piston, the piston grooves and piston-to-cylinder clearances.

Broadly, this invention is directed to an improved hydraulic lift system which comprises a cylinder housing that surrounds a cylindrical core. The cylindrical core is preferably made out of extruded plastic. Examples of such plastics are polyethylene, polypropylene, polycarbonates, polyaminimides, and polyvinylchloride. The invention takes advantage of a cooperative interaction between the cylinder housing which is preferably in the form of a regular polygon. Examples of suitable regular polygons are those that have at least four sides.

In a preferred embodiment, the regular polygon which surrounds the central cylindrical core provides a space at the edges where sides of the regular polygon intersect and the central plastic core sufficient to have a bolt welded along one or more of such edges.

The cylinder housing is preferably made from stainless steel sheet metal having a gauge of 8 to about 14. Contact between the central core cylinder and the cylinder housing occurs at points at which an inscribed circle would contact the cylinder housing. It is expected that other than regular polygons may be used. However, the advantages of uniformly distributing forces would not be available. A six sided ploygon or hexagon for the cross-section of the housing is preferred.

The distance between the outside diameter of the core cylinder and the inside diameter of the inscribed circle that just fits within the regular polygon shaped housing is generally no more than twenty-thousandths (20/1000). As the distance increases, there is an increasing tendency for wear and breakage. Preferably, the outer wall of the core cylinder is in integral contact with the interior walls of the cylinder housing.

Preferably, the cylinder assembly further comprises at least two end cap closure supports to permit pivotal mounting of the improved hydraulic lift system to a support column. The top end assembly comprises a pivotal bearing with a ledge; a top end plate; and an end plate with a groove. Within the groove are a top edge of the cylindrical core, and a portion of the cylindrical core that extends beyond the housing. The cylinder core extends beyond the housing by an amount in the range of 0.10 to 1 inch, and preferably on the order of one quarter of an inch. When assembled the extended core portion is disposed within the groove and the housing abuts the end plate.

The bottom end assembly comprises an end plate; a fluid sealable fitting with a groove to accommodate: a seal means such as a gasket or o ring; the bottom edge of the cylindrical core and at least a portion of the bottom cylinder core which extends beyond the bottom of the housing, which extension is in the range of 0.1 to 1 inch, and preferably on the order of one quarter of an inch. The bottom is assembled similarly to the top whereby there is support for that portion of the central plastic core which extends beyond the housing into the groove of the bottom end cap.

The end caps serve three purposes: they provide a means for pivotally mounting the hydraulic system; they provide a fluid tight seal within the cylinder core;. and they provide exterior support for that portion of the cylinder core which extends beyond the housing.

At the apices where the regular polygon sides merge, bolts are welded within the top and bottom of the housing to extend upwardly and downwardly from the housing. Nuts are screwed on the bolts to apply pressure to compress end cap closure supports. Although the figures show the bolts within the polygonal shaped housing such is not necessary for it to function. However, for best distribution of forces having bolts within the apices is preferred.

The material used in making the polygonal housing is preferably stainless steel having a gauge in the range 8 to 14. In order to ensure strength sufficient for lifting five hundred pounds with a load factor of 2 stainless steel in the range of 8 to 10 is preferred. Clearly as the thickness of the stainless steel sheet increases more support is obtained.

Within the cylindrical core is a piston to which is attached a piston rod. The piston itself has at one end thereof three high pressure hydraulic seals or cup seals which flair when water is applied to the seal.

The piston preferably has a diameter in the range of about four inches to about eight inches and preferably in the range five to seven inches and a length in the range of about two inches to twelve inches and a tolerance in the range fifteen thousandths to one hundred thousandths relative to the cylindrical central core.

As the diameter of the piston increases speed decreases but lift strength increases. For example a four inch diameter piston is routinely used to lift one hundred and fifty pound loads; an eight inch diameter, one thousand pounds and a six inch diameter is used for five hundred pound loads. With decreasing lengths of the piston lateral forces and wear on the cylindrical core tend to increase. There is no limit on the high side of length except from a practical standpoint that as the length of the piston increases so also does friction.

Attached to the piston is a piston rod that comprises a support spine which functions both to lock the orientation of the piston relative to the housing and provide additional load bearing capacity for the piston rod. A cantilevered arm system having a horizontal arm component and a vertical arm component are attached to the piston rod by a dual connection mechanism that comprises: an alignment key or pin adapted to interact with the support spine. This in effect locks the cantilevered arm portion relative to the piston rod. This piston rod in turn is locked relative to the housing by means of orienting or notched end caps which are described in more detail with respect to the figures.

In addition to the hydraulic system, there is a support column that maintains the hydraulic system at a substantially vertical orientation. In order to prevent rotation of the cylinder housing and therefore prevent rotation of the cantilevered arm portion of the hydraulic system, a means for reversibly coupling the support column to the cylinder housing is optionally provided. An example of such a coupling could be a hinge with a male mate section which can be locked together by means of a locking pin. Preferably these couplings are located on opposite sides of the cylinder housing.

Preferably, the couplings are specially designed and adapted hook means for reversibly connecting a bar like object that has a longitudinal axis transverse to the vertical cantilevered arm assembly. This hook system permits rotation about the longitudinal axis and a rest means that provides a fixed support surface relative to the support arm. An example of a chair specifically adapted and designed for reversible connection for the hook and rest means comprises: a carriage assembly comprising a cage structure and a seat assembly comprising side to side or transverse rods that define bearing surfaces, whereby said seat assembly is gravity connectable to said carriage assembly and interacts when coupling or separating along an axis that is substantially perpendicular to said bearing surfaces of said carriage assembly.

In other words, the means by which the chair portion can be attached to the cantilevered vertical arm assembly is such that motion in a direction perpendicular to the ground ensures that the chair is released from a chair assembly which acts as a platform permitting movement of the chair on wheels.

Similarly a stretcher assembly similar to that described with respect to the chair also permits reversible connection to the vertical cantilevered arm in methods discussed in more detail in the specification with respect to the figures. Preferably, connection between the portion of the stretcher or chair that is connected to the lift system is such that connection or disconnect between the stretcher or chair and any carriage used to move the stretcher or chair occurs along an axis that is substantially perpendicular to the ground.

DETAILED DESCRIPTION OF THE DRAWINGS

Figure 1:
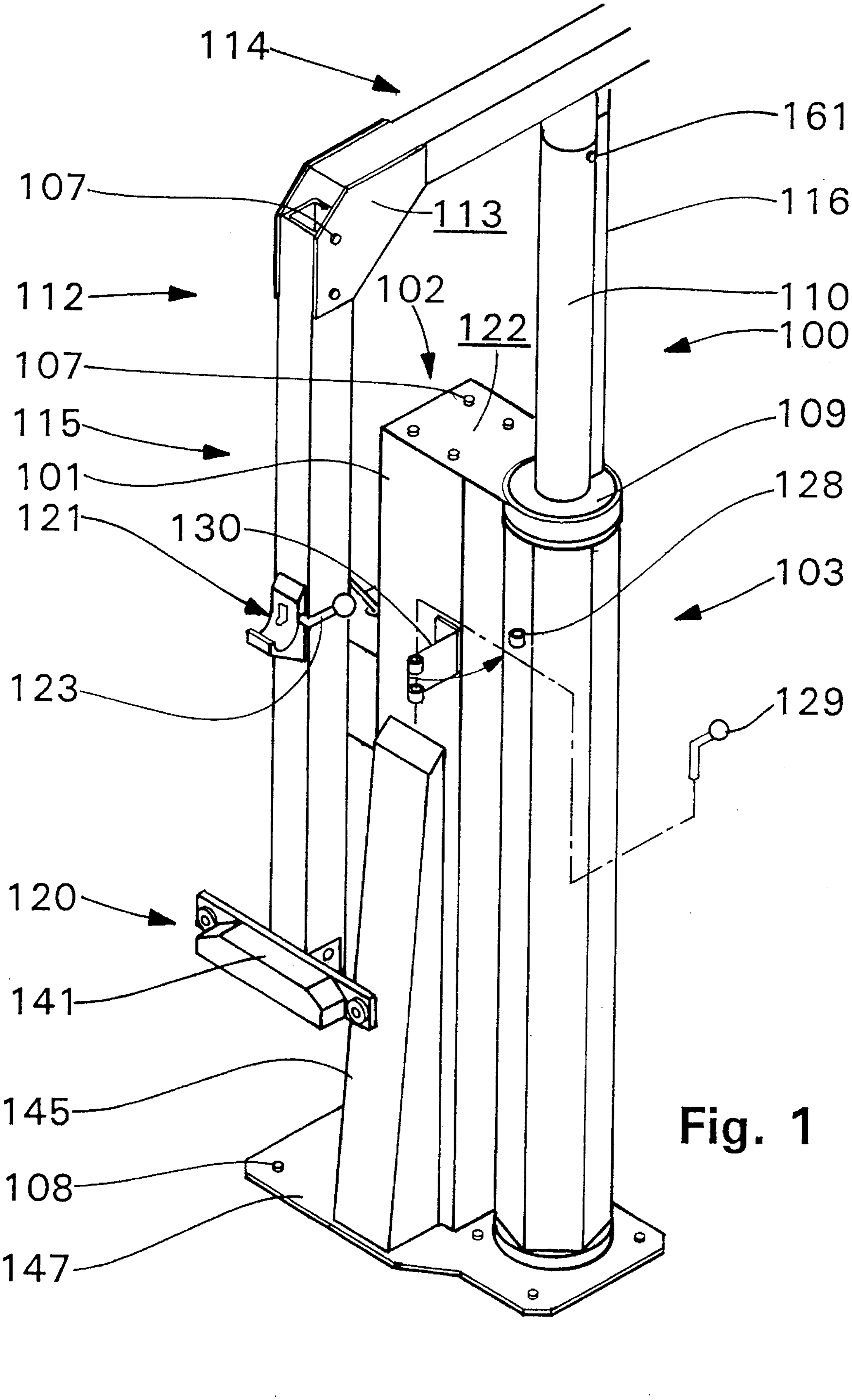
FIG. 1 is a perspective view of a lift apparatus made in accordance with the teaching of the present invention.

FIGS. 1–5 disclose a lift assembly 100 having the following elements: support column 101; top collar 102; hydraulic cylinder assembly 103; base plate 47; support column gusset 145; top end cap 106; bolts 107; deck bolts 108; piston rod support spine 116; piston rod 110; welded piston bolts 142; cantilevered arm assembly 112; connecting flange 113; connecting flange bolts 107; vertical or seat arm 115; hook lock 121; attachment rest 120; ledge 118 of pivotal bearing 106; locator pin 119; cylindrical insert segment 153; piston 132; piston grooves or rings 133; piston cup seals 159; valve housing 127; control valve lever 124; end cap 152; bottom end bearing 126; locking hinge mate 128; locking hinge pin 129; locking hinge 130; cylindrical barrel or core 131; piston 132; top end plate 134; bottom end plate 135; deep ring groove 136; water inlet 137; water fitting 138; and hexagonal cylinder housing 104.

Figure 3:
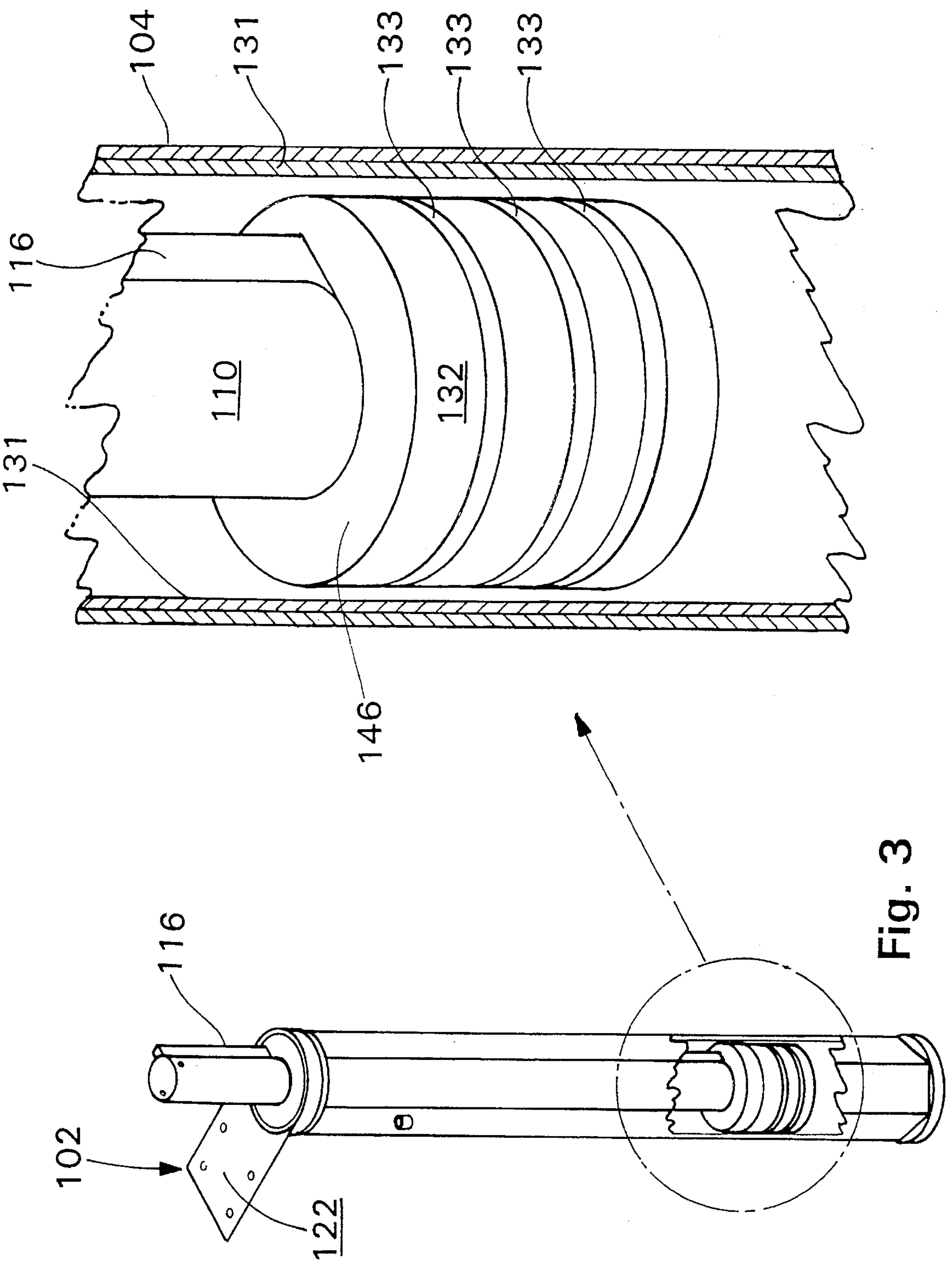
FIG. 3 is an exploded and enlarged view of a section of a hexagonal cylinder housing containing a cylindrical plastic core within which core a piston rod and spine support are located.

As best seen in FIG. 3, within hexagonal cylinder housing 104 is a cylindrical barrel or core 131. Cylindrical barrel 131 is preferably made of plastic such as polyvinylchloride, polyethylene, polypropylene, polycarbonates, polyaminimides, and the like. There is no limitation on the plastic that may be used except that is must have sufficient impact strength to be introduced with pressure into cylinder housing 104.

The strength of the hydraulic cylinder assembly is enhanced from the cooperative interaction between cylinder barrel or core 131 and the hexagonal cylinder housing 104. Other polygon shapes other than hexagons can be used. For example any polygon in excess of four sides can be used. Preferably, the configuration provides space for welded bolts 142 shown in FIG. 3 along inner angle of edge 111.

The hexagonal cylinder housing 104 and cylinder 131 provide not only burst strength to maintain a water tight seal within cylindrical barrel 131, but also sufficient rigidity to support the lifting and rotation of cantilevered loads with respect to the support column 101.

Referring to FIGS. 1–5, the various elements of lift assembly 100 are disclosed. There are three functionally interacting parts. These parts are: hydraulic lift system 103; support column 101; and cantilevered arm assembly 112. In lift assembly 100, hydraulic lift system 103 is pivotally attached to support column 101 and cantilevered arm assembly 112 is attached to piston rod 110 of hydraulic lift system 103. Piston rod 110 moves in and out of housing 104 as a result of different hydraulic pressures. Rotary motion of the piston rod 110 with respect to the housing 104 is prevented by a spine 116 which is keyed relative to the housing 104. In order to pivot cantilevered arm assembly 112 from one location to another, hydraulic lift assembly 103 including housing 104, piston rod 110, and cantilevered arm assembly 112 are moved as a single unit.

Lift assembly 100 comprises three parts: an hydraulic lift assembly system 103, a support column 101, and a cantilevered arm assembly 112. Hydraulic lift system 103 comprises a housing 104, a cylindrical barrel or cylindrical core 131, a piston rod 110, and a piston 132 which has piston rings 133, top end cap assembly 151, and a bottom end cap assembly 150.

Figure 4:
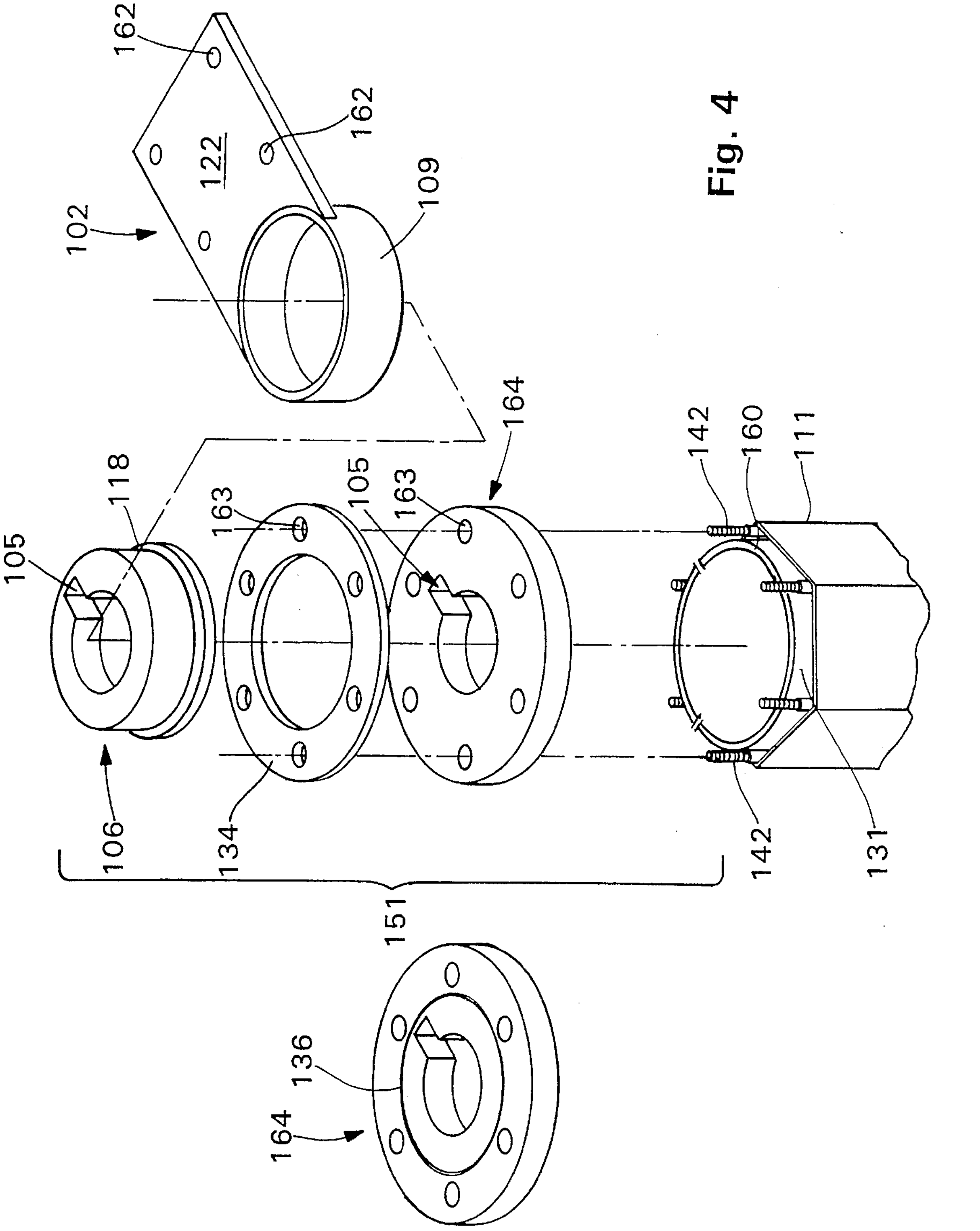
FIG. 4 discloses top cap assembly in exploded view for the hydraulic lift assembly.

Top cap assembly 151 of FIG. 4 comprises top end plate 134 having bolt holes 163 and flange plate 164. Flange plate 164 has a groove 136 which is designed to receive the top edge 160 of cylindrical core 131. The flange plate 164 has a selectively configured opening 105 through which the piston rod 110 passes in a keyed relationship. Also included in top cap assembly 151 is a top end plate 134 a pivotal bearing 106 with spine lock opening 105. Pivotal bearing 106 has a ledge 118 which contacts top collar 102 just below retainer ring 109 to permit pivotal rotation within retainer ring 109. Retainer ring 109 is fixedly attached to flange plate 120. Flange plate 120 is fixedly attached with bolts through bolt holes 162 or other attachment means to support column 101.

Figure 5:
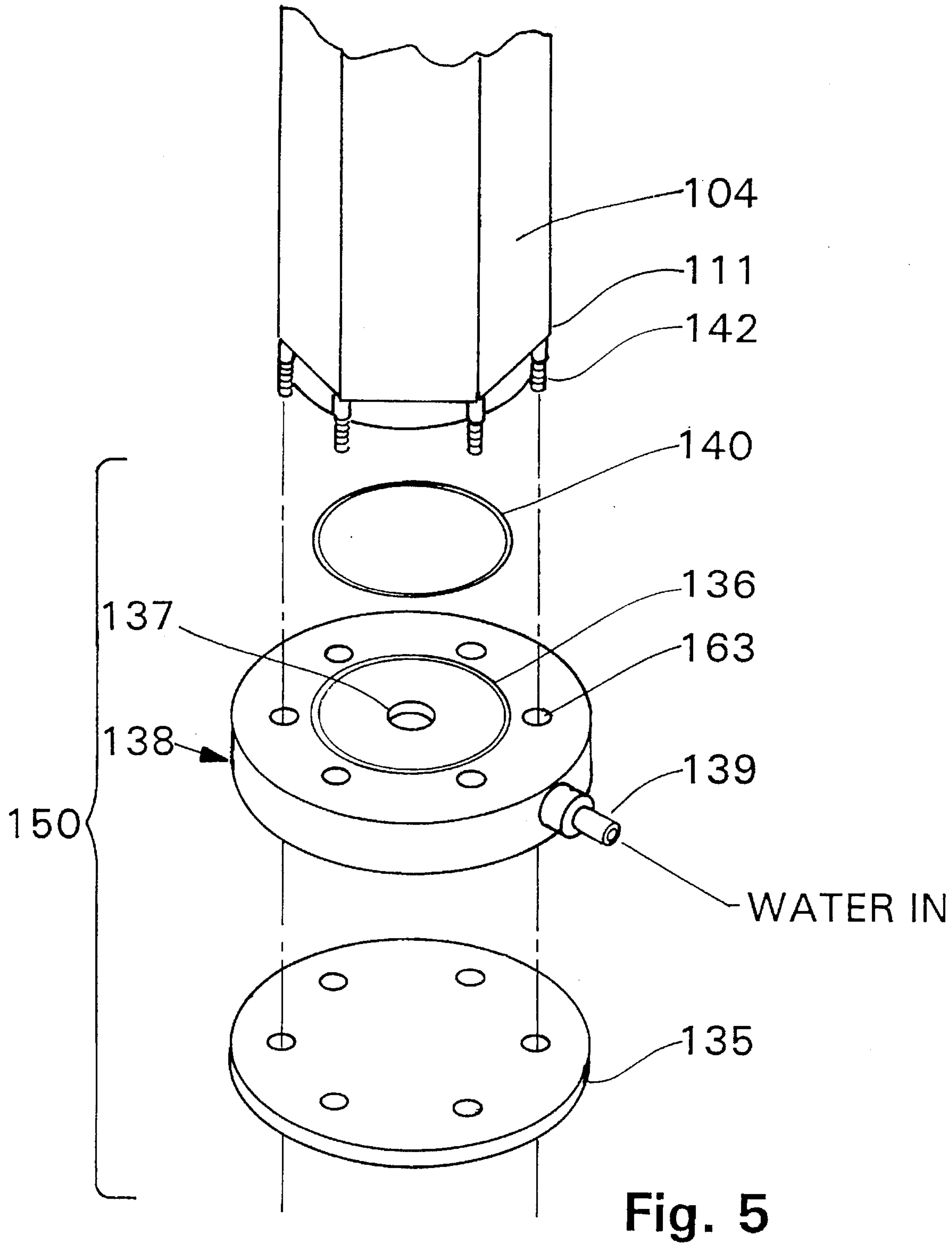
FIG. 5 shows the bottom cap assembly in exploded view for the hydraulic lift assembly.

Bottom end cap assembly 150 of FIG. 5 comprises end plate 135, water fitted seal plate 138 having a groove 136 a water inlet/outlet 137 and a water fitting 139, o ring 140 sized to fit within groove 136. Bolt holes 163 through end plate 135, and water fitted seal plate 138 in combination with bolts 142 preferably welded to housing 104 at edges 111 provide a means for securing end plate 135 to water fitted seal plate 138 in a fluid tight seal with cylindrical core 131. Grooves 136 in end seal plate 138 provides not only a fluid tight seal but also burst strength support to that portion of cylindrical core 131 that extends beyond housing 104. Attached to end plate 135 is a stainless steel slide 156 shown in FIG. 2. Surrounding this stainless steel slide 156 is a plastic lubricating ring 157 which is between stainless steel slide 156 and bearing retainer 158.

The cooperative interacting parts of hydraulic assembly 103 improve strength and performance of materials. The polygon shaped housing 104 reinforces cylindrical core 131 by distributing burst, compression, and bending forces uniformly around the circumference of cylindrical core 131 by contact between exterior surfaces of cylindrical core 131 and interior surfaces of housing 104. The fluid tight sealing of the central core 131 in the hydraulic assembly takes into account both the need to lift a piston rod and the need to be able to withstand torque forces resulting from cantilevered arm assembly 112.

The plastic cylindrical core 131, which ordinarily alone does not have the strength requirement for the lift system, is reinforced with the polygon shaped housing. The polygon shaped housing has at least four sides. However, the number of sides is preferably limited in so far as there is preferably space available for flange bolts 142 which are preferably soldered at edges 111. As shown in FIG. 4, there are spaces at edges 111 which permit attachment of bolts 142 without interfering with cylindrical core 131.

In top cap assembly 151 of FIG. 4 top edge 160 is inserted into a groove specifically adapted and sized to accommodate a portion of cylindrical core 131 including a top edge 160 and some side surfaces thereof within end plate 164. End plate 164 has a spine lock groove 105. Groove 136 in end plate 164 is machined to insure end plate 164 accommodates all of cylindrical core 131 when top plate 134 is bolted in place by means of bolts 142 which pass through bolt holes 163 in end plate 164 and top end plate 134.

End plate 164 reinforces that portion of cylindrical core 131 that extends beyond housing 104. Just as housing 104 provides burst strength, so too does end plate 164. Top or first collar 102 has a retainer ring 109 which slides over pivotal bearing 106. Pivotal bearing 106 has a ledge 118 which insures that it remains within retainer ring 109 along ledge 118. Pivotal bearing 106 has a spine lock groove 105 which ensures that the piston rod does not rotate around the rod but instead remains fixed relative to housing 104.

Bearing retainer 158 in conjunction with bottom end cap assembly 150 of FIG. 5 facilitates rotation of housing 104 by means of stainless steel slide 156 which fits within lubricating bearing 157 relative to a fixed retainer ring 158 shown in FIG. 4.

Top end cap assembly 151 of FIG. 4 permits rotation of housing 104 within collar 102 by means of a pivot or top bearing 106 contained within retainer ring 109 of top collar 102. Top collar 102 is attached by flange plate 122 to the top of support column 101 with bolts 107 through bolt holes 162 shown in part in FIGS. 2 and 4.

As shown in FIG. 1, support column 101 can be reinforced relative to a deck plate or ground plate 147 by gusset supports 145. Attached to column support 101 is a locking hinge 130 which can interlock with locking hinge mate 128 which is attached to the exterior of housing 104. Locking hinge pin 129 when inserted through an interconnecting locking hinge 130 and locking hinge mate 128 will prevent rotation around bearing retainer ring 158 and top collar 102. Preferably there are two such locking hinges and corresponding locking hinge mates. This is to prevent unwanted motion when a person is loaded onto the cantilevered arm or offloaded from the cantilevered arm. Conventional means are used to secure support column 101 via plate 147 adjacent a pool or spa.

Figure 2:
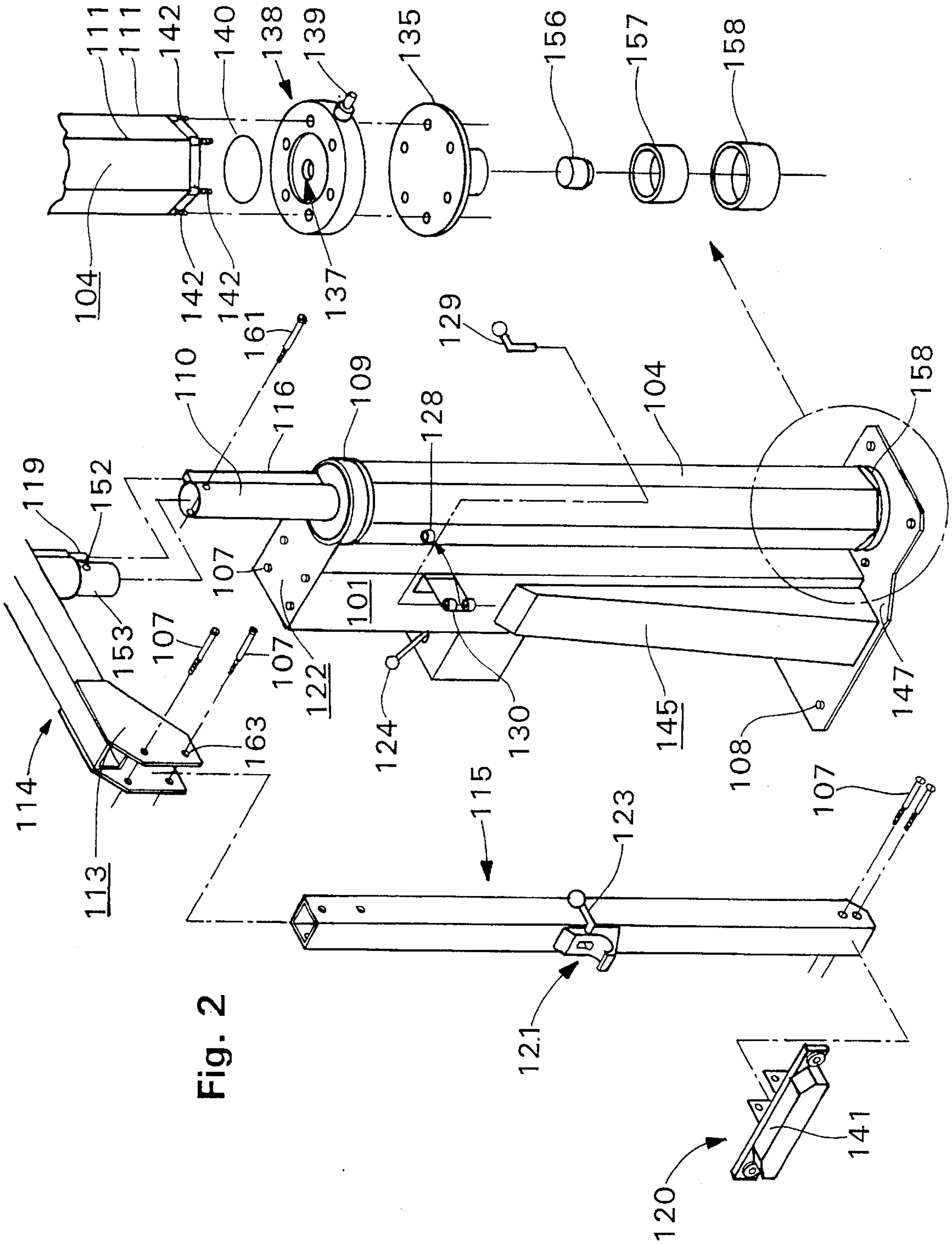
FIG. 2 is a partial exploded disassembled view of the apparatus shown in FIG. 1.

As shown in FIGS. 1 and 2, cantilevered arm assembly 112 comprises a horizontal arm 114 and a vertical arm 115. Horizontal arm 114 is attached to vertical arm 115 by means of connecting flanges 113 and bolts 107 through appropriate bolt holes 163. Suitable materials for horizontal and vertical arms are: rectangular, square, or c-channel stainless steel. Horizontal arm 114 is attached to piston rod 110 by means of a cylindrical insert segment 153 which is then bolted to piston rod 110. Locating pin 119 shown in FIG. 2 cooperatively interacts with support spine 116 so that horizontal arm is held in a fixed orientation relative to piston rod 110 and corresponding support spine 116. Piston rod 110 is strengthened by support spine 116. Examples of support spine materials that can be used in conjunction with piston rod 110 are: square, rectangular, or c-channel stainless steel. Bolt hole 152 permits interconnection with cylindrical insert segment 153.

As shown in FIGS. 1 and 2, lock hook 121 is attached to vertical arm 115. Associated with lock hook 121 is hook lock catch lever 123. Also attached to vertical arm 115 is a stainless steel support or attachment rest 120. Lock hook 121 permits reversible attachment to a bar which is permitted to rotate around the axis of the bar. This in conjunction with attachment rest 120 provides a secure means of reversibly attaching either a wheel chair seat or a stretcher. Attachment rest 120 has a substantially horizontal load bearing surface 141 shown in FIG. 2, which interacts with a corresponding surface on a chair or stretcher.

As shown in FIG. 3, piston 132 has at least three piston rings 133 that are spaced apart. Piston 132 is preferably at least six inches in axial length and is fixedly attached to piston rod 110 and support spine 116.

Each ring is roughly three eighths inch in cross section and begins about one quarter of an inch from top piston surface 146 and corresponding bottom piston surface not shown. Equally spaced between top and bottom surfaces of piston 132 is a piston ring also approximately three eighths inch in cross section. Within each of these piston rings are rubber cup seals designed for pistons used in hydraulic lifts. These are convention rubber cup seals that tend to flair when a pressure of liquid is applied to the seal.

The distance between piston rings 133 varies depending upon the length of the piston. For example, a piston six inches long having three rings in accordance with this invention would have a distance of two and three sixteenths inches approximately between three eighths inch grooves. In another example, an eight inch piston would have approximately three and three sixteenths inches between three eights inch grooves.

Depending upon the inside diameter of cylindrical barrel 131, the amount of cocking that piston 132 undergoes at its furthest cantilevered extension points requires at least three piston rings 133 with one being located substantially at the midpoint of piston 132 in order that at least one seal be maintained throughout the movement of piston 110 and all possible cantilevered orientations. Preferably, the piston is between two to twelve inches in length. As the size of the piston and distance between piston rings 133 is decreased, there tends to be an increase in wear due to greater interaction between the piston and cylindrical core due to the load forces imposed by the cantilevered arm assembly 112. On the other hand, as the size of the piston and the distance between piston rings 133 is increased, friction forces tend to increase to such a degree as to make sliding motion of piston 132 within cylindrical core 131 too difficult for practical use.

In operation, hydraulic pressure caused by the flow of hydraulic fluid, such as water, through fluid tight fitting 139 into the core cylinder 131 via passage 137 serves as the motive force for applying pressure against piston 132.

Figure 6:
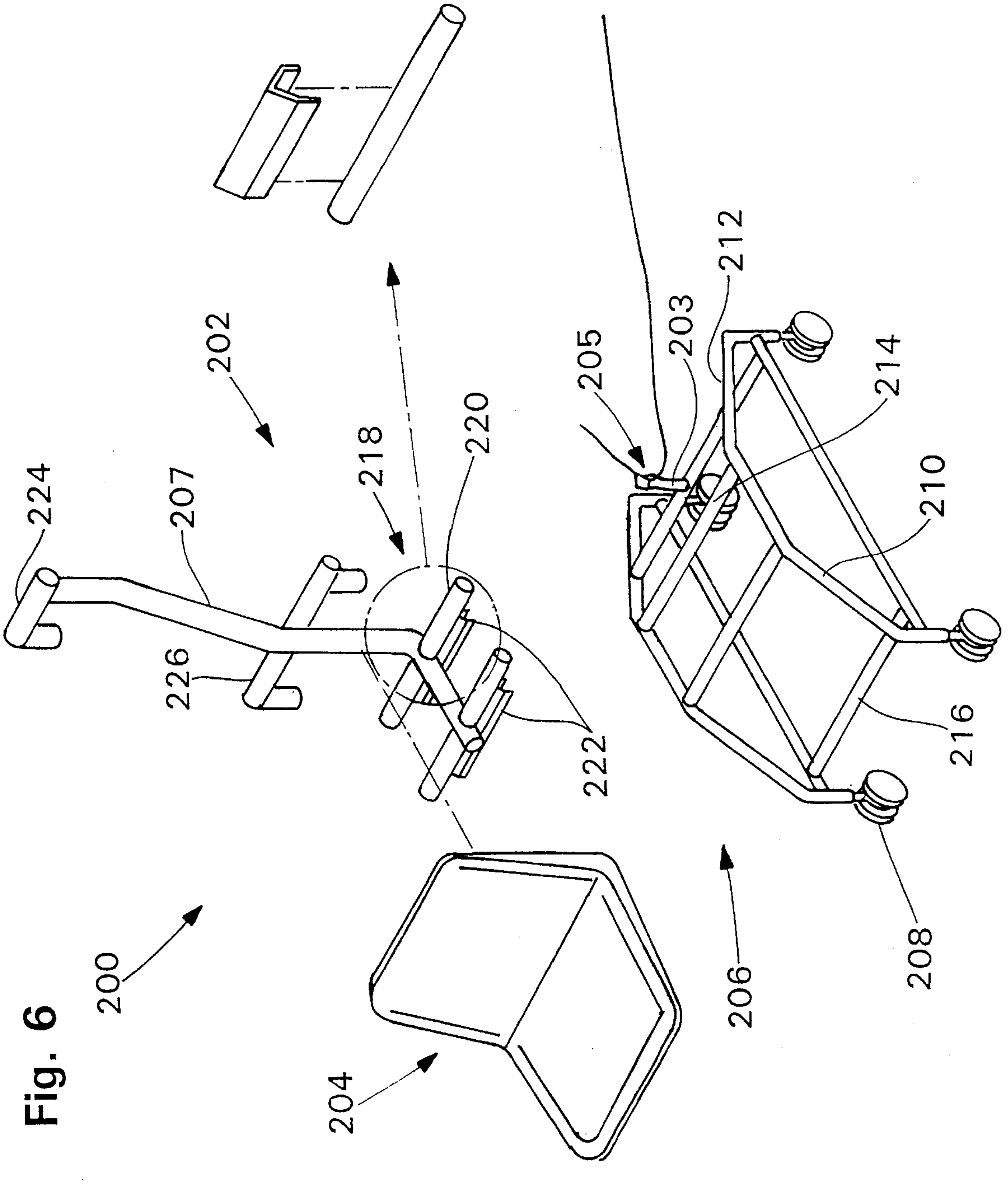
FIG. 6 is an exploded view showing the wheel chair of FIG. 6 in its disassembled form.

Referring to FIG. 6, assembly 200 comprises a separable chair 204 attached to support 202 and a carriage 206 to which the combination of a separable chair and support 202 can be reversibly attached. Separable chair and support 202 comprises a vertical bar support 207 connected to at least two horizontal bars: horizontal bar 224 and horizontal bar 226. Horizontal bars 222 are located to reversibly attached to carriage 206 at a height suitable for connection with hook lock 121 when piston rod is in its fully inserted position relative to cylindrical core 131. When horizontal bar 224 interacts with hook lock 121, a small rotation of from about 1 to 5 degrees about horizontal bar 224 causes bar 226 to rest against attachment rest 120 shown in FIGS. 1 and 2 as piston rod 110 moves out of housing 104. Rotation about horizontal bar 224 stops when contact is made between horizontal bar 226 and load bearing surface 141 of attachment rest 120. Optionally chair 204 may have safety belts or other restraining means to insure that a person seated in 204 will not inadvertently fall out.

Figure 7:
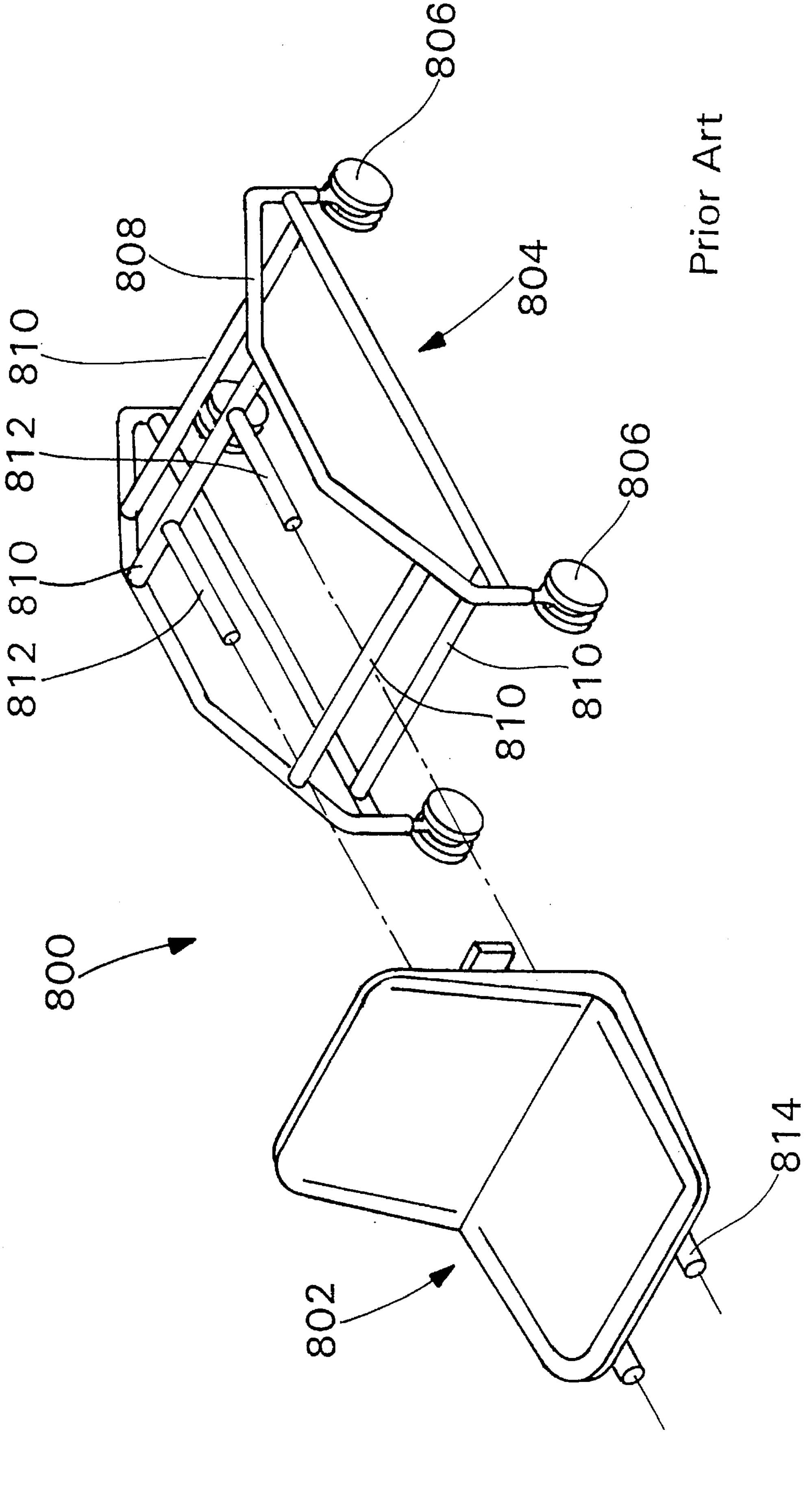
FIG. 7 shows a prior art wheel chair in an exploded view showing the difficulty and differences in how such a wheel chair is disassembled for use in conjunction with a lift such as disclosed in the instant invention.

Referring to FIG. 7, there is disclosed a prior art carriage chair and support carriage 800. Chair 802 couples to support carriage 804 by means of interconnecting tubes. These tubes involve insertion of forward oriented tube coupling 812 within interlocking coupling of oriented tube coupling 814. A horizontal movement of the chair 802 relative to carriage 804 is required in order to interlock chair 802 with carriage 804. This is to be contrasted with the motion of the lift which employs a vertical component of movement for reversible coupling between a chair and its corresponding support carriage.

Gravity assisted c-hooks 222, of a seat assembly shown in FIG. 6, are detachably connected to transverse seat support rods 220 of carriage 206. While maintained in a substantially horizontal orientation, the coupling of gravity assisted c-hooks 222 and transverse connector top rods 214 will occur in a smooth fashion as the seat is vertically displaced. Transfer of separable chair 204 and support 202 from the carriage 206 by the lift is easily accomplished since the only motion necessary for connection or disconnection is a motion in a direction substantially perpendicular to the ground. The vertical arm 115 as part of the hydraulic system is raised or lowered by piston rod 110. Orientation of separable chair and support 202 on the lift is maintained by three points of interaction: horizontal bar 224 within lock hook 121 and contact between horizontal bar 226 and load bearing surface 141 of attachment rest 120.

Seat 204 can be attached in any number of ways readily understood by persons of average skill in the art to separable chair and support system 202.

Though it can be readily imagined having gravity assisted seat locks disposed in an orientation from front to back rather than side to side, it is preferable to have gravity assisted c-hooks running from side to side rather than front to back. However, with gravity assisted c-hooks oriented from side to side, there is a possibility of rotation about transverse connected top rods 214 in a rearward direction which can be prevented by means of vertical restraint 205 shown in FIG. 6. Vertical restraint 205 has a top coupling 203 which interacts with vertical bar support 207 to prevent rearward motion thereby stabilizing the structure consisting of separable chair and support 202 with carriage 206.

Carriage 206 is a cage structure from which four wheels 208 extend. The cage structure has the side frame 212 and transverse or side to side connector top rods 214. The simple cage structure 210 makes it possible to have a readily separable and attachable system 202.

Figure 8:
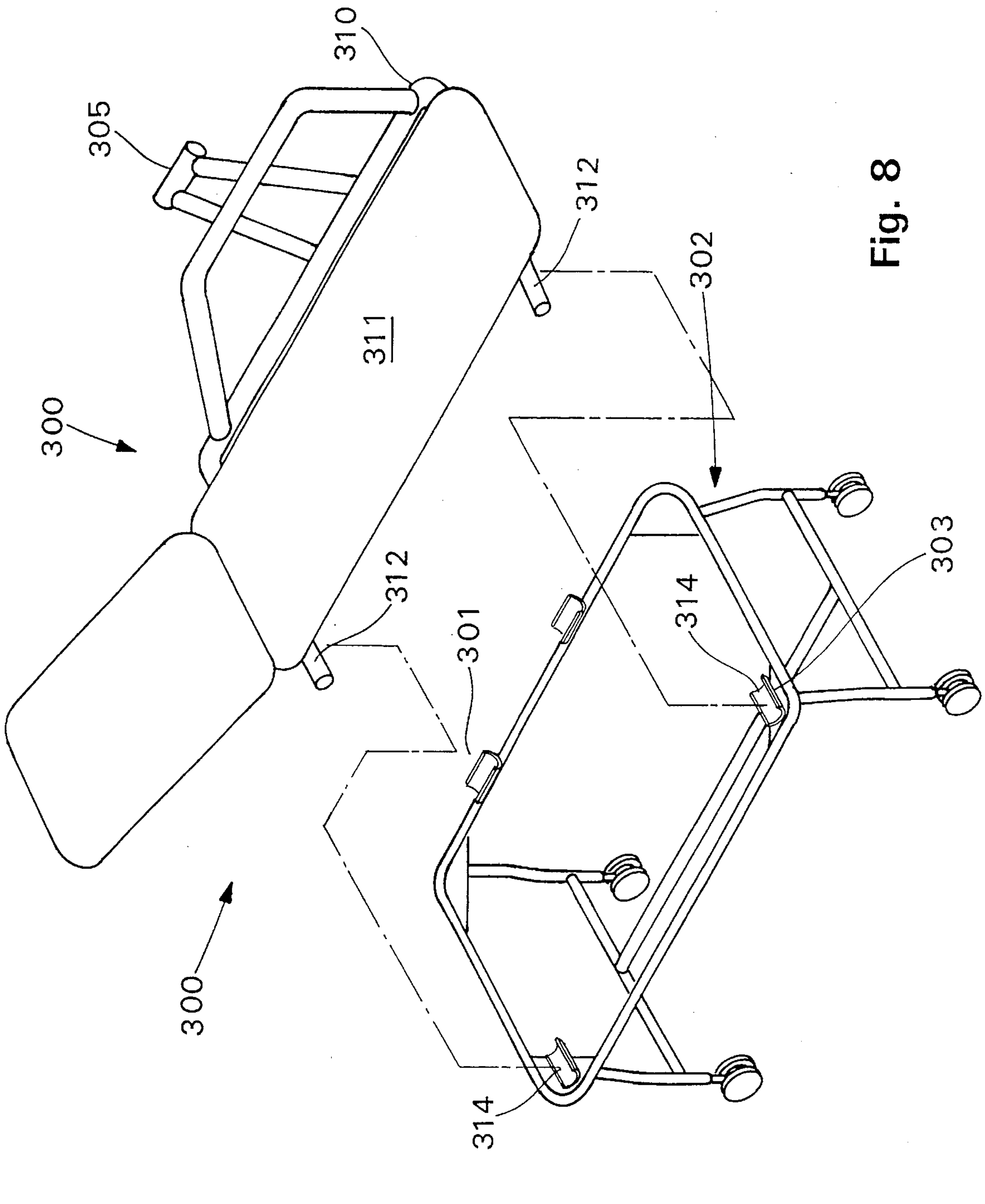
FIG. 8 is a perspective view of a stretcher specifically designed and adapted for use in conjunction with the instant invention.

A carriage and stretcher assembly 302 is shown in FIG. 8 which is specifically adapted for use with the lift. C-clamps 301, 314 are mounted on the carriage structure 302. Horizontal support bars 310 which run the length of stretcher 311 are adapted to fit within c-clamps 301 of stretcher undercarriage 302. Length determining rods 312 are adapted to interact with gravity assisted c-clamps 314. The result is that a very stable structure is formed where there no tendency to move from side to side as a result of interactions with transverse gravity assisted c-clamps 314 and 301. There is no tendency to rotate around gravity c-clamps 301 or 304.

The stretcher arrangement is different from the wheel chair arrangement in two ways the gravity assisted c-clamps in the stretcher situation are oriented with the opening upward and adopts two directions one direction of c-clamps 301 is from side to side and the other, of c-clamps 314, front to back. This is different from the wheel chair in which the c-clamps are both oriented downward and are parallel to one another rather than being at orientations which are at right angles to one another.

In manufacturing the lift assembly, a method for assuring the snug fit of the cylinder 131 within the housing 104 is required. To insure a snug fit between the cylinder housing 104 and cylindrical core 131, no more than fifty thousandths (50/1000) of an inch difference should be present between the diameter of an inscribed circle within cylinder housing 104 and the outside diameter of cylindrical core 131. Preferably, there is no difference.

In the preferred embodiment, where the cylinder housing 104 has a cross sectional configuration of an hexagon, the housing is formed in two halves having three sides each. Cylindrical core 131 is placed within one half of the cylinder housing 104 and the top half is then tack welded in place such that all six sides are in contact with the cylinder 131. The tack weld is for alignment and is not intended to provide strength. Once the tack welds have been applied, the cylindrical core 131 is removed. A plunger device can be used to facilitate removal. Equally spaced welds of approximately one inch in length are used to fuse the edges and to form the rigid hexagonal housing. Preferably, welds are spaced no more than nine inches apart. After welding the cylindrical core 131 is forcibly inserted into the cylinder housing 106 whereby the cylindrical core is disposed within the cylinder housing in a compression fit. The plastic from which the cylinder 131 is made must have sufficient impact strength to withstand the forces necessary to force the cylindrical core 131 into the hexagonal cylinder housing 104. To facilitate insertion the edges of one end of the housing may be slightly flared prior to insertion of cylindrical core 131.

A similar procedure can be done regardless of the number of faces of the polygon.

In summary, the method preferred for making a cylindrical core 131 contained within cylinder housing 104 comprises tack welding each segment of the housing while cylindrical core 131 is within the cylinder housing 104 followed by removing cylindrical core 131 and then full welding the cylinder housing 104, followed by reinsertion of cylindrical core 131.

Specific compositions, methods, or embodiments discussed in this specification are intended to be only illustrative of the claimed invention. Variations of any of these that would be readily apparent to a person of skill in the art based upon the teachings of this specification and the skills of a person of ordinary skill in the relevant art are intended to be within the scope of the disclosed invention.

What is claimed is:

1. A lift apparatus to assist access to and egress from a pool or spa comprising:

a hydraulic lift system including:

a hollow cylinder housing having a substantially uniform cross section in the shape of an equilateral polygon;

a cylinder having a substantially uniform round cross section;

said cylinder being disposed in a compression fit within said cylinder housing; and a piston operatively disposed within said cylinder.

2. The lift apparatus of claim 1, wherein said cylinder housing is hexagonal in cross section.

3. The lift apparatus of claim 1, wherein said cylinder housing is made from flat sheet stainless steel having a gauge in the range 8–14.

4. The lift apparatus of claim 1, wherein said cylinder is made from an extruded plastic.

5. The lift apparatus of claim 4, wherein said cylinder is made from an extruded plastic selected from the group consisting of: polyethylene, polypropylene, polyvinyl chloride, polycarbonate, polyamidimide, polyester, or polyamine.

6. The lift apparatus of claim 1, wherein said hydraulic lift system further comprises two end caps mounted on opposing ends of said cylinder via connecting rods disposed between said cylinder and said cylinder housing.

7. The lift apparatus of claim 1, wherein said piston has at least three separate fluid tight ring seals.

8. The lift apparatus of claim 7, wherein said piston has a diameter in the range of about four to eight inches; a length in the range of about two to twelve inches; and a distance between rings in the range three sixteenths to five and three sixteenths inches.

9. The lift apparatus of claim 1, wherein a cantilevered arm system is attached to a piston rod that is connected to said piston.

10. The lift apparatus of claim 9, wherein said hydraulic lift system is pivotally mounted to a base; and said piston rod has reinforcing spine means keyed to an end cap mounted on one end of said cylinder and said cylinder housing such that said cantilevered arm system and said hydraulic lift system are pivotally displaceable as a unit.

11. The lift apparatus of claim 9, wherein said cantilevered arm system comprises:

a support arm;

a hook means for reversibly connecting a bar-like object, that has a longitudinal axis, to said support arm while permitting rotation about said longitudinal axis; and a rest means for providing a fixed support surface relative to said support arm.

12. A chair specifically adapted and designed for reversible connection with said hook means and rest means of claim 11, comprising:

a carriage assembly and a seat assembly;

said seat assembly being gravity connectable to said carriage assembly along a substantially vertical axis; and said seat assembly including a seat and a frame having an upper bar with a horizontal axis for operative association with said hook means and a lower bar selectively spaced from said upper bar for engagement with said rest means.

13. A stretcher assembly specifically adapted and designed for reversible connection with said hook means and rest means of claim 11 comprising a carriage comprising:

a carriage assembly and a stretcher assembly;

said stretcher assembly being gravity connectable to said carriage assembly along a substantially vertical axis; and said stretcher assembly including a stretcher and a frame having an upper bar with a horizontal axis for operative association with said hook means and a lower bar selectively spaced from said upper bar for engagement with said rest means.

14. A lift apparatus to assist access to a pool or spa comprising:

a base;

a hydraulic assembly rotatably mounted on said base including a hydraulically displaceable piston means and supporting cylinder means;

a lift arm assembly, to which occupant carrying means may be attached, being mounted to said piston means such that when an occupant carrying means is attached to said lift arm assembly said occupant carrying means is vertically displaceable by hydraulically displacing said piston means and is horizontally displaceable by rotatably displacing said hydraulic assembly with respect to said base whereby when said base is mounted adjacent a pool or a spa said occupant carrying means is displaceable from a position outside said pool or spa to a position within said pool or spa; and said supporting cylinder means comprising a cylinder having a selected length within which said piston means is displaceably disposed and a hollow cylinder housing having a substantially uniform cross section in the shape of a regular polygon within which the cylinder is disposed in a compression fit.

15. A lift apparatus according to claim 14 wherein said cylinder housing is shaped as a regular hexagon in cross section.

16. A lift apparatus according to claim 14 wherein said hydraulic assembly includes end caps mounted at opposite ends of said cylinder via connecting rods which are disposed between said cylinder and said cylinder housing.

17. A method of making a hydraulic lift system for a pool lift apparatus comprising:

providing a plurality of cylinder housing members to be assembled to form a hollow cylinder housing having a substantially uniform cross section in the shape of an equilateral polygon for receiving a cylinder of a selected diameter in a compression fit;

placing a cylinder having said selected diameter on one of said housing members and securing the remaining housing members about said cylinder and in contact therewith via alignment welds;

removing said cylinder from said aligned housing members;

fusing said housing members together in their aligned position via welding thereby completing the assembly of said cylinder housing; and forcibly inserting a cylindrical core having said selected diameter into said assembled cylinder housing.

18. A method according to claim 17 wherein said housing is flared slightly on one end prior to insertion of said cylindrical core to facilitate said insertion.

19. A method according to claim 17 wherein two three-sided housing members are provided to be assembled to form a housing having a hexagonal cross section and said fusing is performed by making welds approximately one inch in length which are substantially equally spaced no more than nine inches apart.

* * * * *